United States Patent
Teng et al.

(10) Patent No.: US 12,146,008 B2
(45) Date of Patent: Nov. 19, 2024

(54) MODIFIED CHITOSAN, PREPARATION METHOD THEREOF, AND ADDITIVE FOR TILE ADHESIVE AND USE THEREOF

(71) Applicant: SHANDONG ETON NEW MATERIAL CO., LTD., Tai'an (CN)

(72) Inventors: Kun Teng, Tai'an (CN); Ming Zhao, Tai'an (CN); Bo Teng, Tai'an (CN); Qinghua Li, Tai'an (CN)

(73) Assignee: SHANDONG ETON NEW MATERIAL CO., LTD., Tai'an (CN)

( * ) Notice: Subject to any disclaimer, the term of this patent is extended or adjusted under 35 U.S.C. 154(b) by 599 days.

(21) Appl. No.: 17/450,376

(22) Filed: Oct. 8, 2021

(65) Prior Publication Data

US 2022/0112312 A1   Apr. 14, 2022

(30) Foreign Application Priority Data

Oct. 10, 2020   (CN) .......................... 202011076111.2

(51) Int. Cl.
   *C08B 37/00*   (2006.01)
   *C08B 37/08*   (2006.01)
   *C09J 101/26*  (2006.01)

(52) U.S. Cl.
   CPC .......... *C08B 37/003* (2013.01); *C09J 101/26* (2013.01)

(58) Field of Classification Search
   None
   See application file for complete search history.

(56) References Cited

FOREIGN PATENT DOCUMENTS

| CN | 102504312 A | * | 6/2012 | |
|---|---|---|---|---|
| CN | 103539868 | | 1/2014 | |
| CN | 106046200 | | 10/2016 | |
| CN | 107840900 | | 3/2018 | |
| CN | 110590966 | | 12/2019 | |
| CN | 111117521 | | 5/2020 | |
| CN | 111171180 A | * | 5/2020 | .......... B01F 17/0028 |
| CN | 111363063 | | 7/2020 | |

OTHER PUBLICATIONS

CN-102504312-A, English translation (Year: 2012).*
CN-111171180-A, English translation (Year: 2020).*
Pengxuan. et al., "Cellulose ether for dry-mixed mortar", Beijing Building Materials Science Research Institute Co Ltd, JC/T 2190-2013, Apr. 25, 2013, 22 pages.
Tiancun, et al., "Adhesives for ceramic wall and floor tiles", China Building Materials Academy, JC/T 547-2005, Feb. 14, 2005, 38 pages.
Chinese Application No. 202011076111.2, First Office Action, Feb. 3, 2021, 8 pages.
Chinese Application No. 202011076111.2, Second Office Action, Mar. 19, 2021, 9 pages.

* cited by examiner

*Primary Examiner* — Stefanie J Cohen
(74) *Attorney, Agent, or Firm* — DLA PIPER LLP (US)

(57) ABSTRACT

The disclosure provides a modified chitosan, a preparation method thereof, and an additive for a tile adhesive, and belongs to the technical field of building additives. In the disclosure, chitosan, an inorganic base, a dispersant having a hydroxyl group and an etherifying agent are added at one time, avoiding the tedious operation of adding inorganic alkali or etherifying agent multiple times. In addition, the etherification reaction is continuously performed under the conditions of gradual temperature increase and pressure increase.

9 Claims, 2 Drawing Sheets

MODIFIED CHITOSAN, PREPARATION METHOD THEREOF, AND ADDITIVE FOR TILE ADHESIVE AND USE THEREOF

CROSS REFERENCE TO RELATED APPLICATION

This application claims priority to Chinese Patent Application No. 202011076111.2, filed on Oct. 10, 2020, which is herein incorporated by reference in its entirety.

TECHNICAL FIELD

The present disclosure relates to the technical field of building additives, in particular to a modified chitosan, a preparation method thereof, and an additive for a tile adhesive, and use thereof.

BACKGROUND ART

Chitosan (CTS), whose chemical name is (1,4)-2-amino-2-deoxy-β-D-glucose, also known as deacetylated chitin, is a white translucent solid, insoluble in water, alkali and most organic solvents. Chitosan is the N-deacetylation product of natural polysaccharide chitin. Usually, chitin with a degree of deacetylation not less than 55% or deacetylated chitin that could be dissolved in 1% acetic acid/hydrochloric acid is called chitosan. Chitin (CS) is widely found in nature in the crustaceans of marine arthropods such as shrimps and crabs, the crustaceans of insects, the cell membranes of fungi and algae, the shells and bones of mollusks, and the cell walls of higher plants. Chitin has a lower reserve only than cellulose, and it is the second largest natural macromolecule. The annual biosynthesis of chitin is about 10 billion tons. It is a recyclable renewable resource, and inexhaustible. Therefore, chitosan has a wide range of sources and is abundant in nature. Because of free amino groups, it is the only alkaline polysaccharide currently known in natural polysaccharides.

The amino group in the molecular structure of chitosan is more reactive than the acetylamino group in the chitin molecule, which allows the polysaccharide to have excellent biological functions and undergo chemical modification reactions. Chitosan is considered to be a functional biomaterial with greater application potential than cellulose. Chitosan has a variety of physiological functions such as biodegradability, biocompatibility, non-toxicity, antibacterial, anti-cancer, lipid-lowering, and immunity enhancement, which is widely used in food additives, textiles, agriculture, environmental protection, beauty and health care, cosmetics, antibacterial agents, medical fibers, medical dressings, artificial tissue materials, drug sustained-release materials, gene transfer carriers, biomedical fields, medical absorbable materials, tissue engineering carrier materials, medical treatment and drug development, and many other fields and other daily chemical industries.

At present, the production of chitosan is mainly concentrated in some countries of Europe and America, Japan and India, etc., while the chitosan production enterprises in China are mainly concentrated in coastal areas and the scale is still relatively small. This is mainly because chitosan only has good solubility in dilute acids, and has poor solubility in many other solvents, especially water, which limits its application. At present, the annual output of aquatic shrimps and crabs in China is about 8 million tons. Although the annual output of chitin has exceeded 100,000 tons, the annual output of chitosan is less than 20,000 tons. Its use is mainly concentrated in the food and medicine industries, and it is rarely used in the industrial field, especially in the construction field. There is no relevant literature report on the use in the field of building tile adhesives. As a decorative material, tile has a broad market. Therefore, it is necessary to chemically modify chitosan to prepare unique water-soluble derivatives to meet the tensile bonding strength and anti-slip performance requirements of tile adhesives, to expand the application fields of chitosan.

Under certain conditions, chitosan could undergo chemical reactions such as hydrolysis, alkylation, acylation, carboxymethylation, sulfonation, nitration, halogenation, oxidation, reduction, condensation, and complexation, and could generate various chitosan derivatives with different properties. At present, the most important modification method in industry is to etherify chitosan to produce a chitosan ether. The most commonly used method is carboxymethylation modification, and the modification methods mainly include organic solvent method and dry grinding. The organic solvent method is as follows: using chitosan or chitin as a raw material, ethanol or isopropanol and other organic solvents as inert media, alkalizing with concentrated alkali, and adding chloroacetic acid to undergo a substitution reaction with chitosan or chitin to prepare carboxymethyl chitosan (CMCTS). The dry grinding method is as follows: using a mechanochemical method and high-energy ball milling process, using chitosan, sodium hydroxide, sodium chloroacetate solid as raw materials, and performing solvent-free solid phase carboxymethylation to prepare a water-soluble carboxymethyl chitosan. At present, the hydroxyalkyl modification of chitosan in industry mainly adopts the organic solvent method, and there is no literature report on the dry process.

CN103539868A discloses a method for preparing carboxymethyl chitosan, in which an organic solvent method was used to prepare CMCTS with a degree of substitution of 1.1-1.5. CN106046200A discloses a semi-dry grinding method for preparing carboxymethyl chitosan, which comprises the step of grinding while dripping distilled water to obtain CMCTS with a degree of substitution of 1.73. CN107840900A discloses an O-hydroxypropyl chitosan and the preparation method thereof, in which an organic solvent method was used to prepare hydroxypropyl chitosan with a relative molecular mass of 54,500-272,000 through steps of alkalization and etherification. CN111363063A discloses a hydroxyethyl chitosan derivative and a preparation method thereof, in which an organic solvent method was used to prepare water-soluble hydroxyethyl chitosan (HECTS) with 2-chloroethanol as an etherifying agent.

The main problems existing in the above products or methods are as follows:

1) The above preparation process for the modified chitosan requires a large amount of organic solvents as the dispersion medium. Only the grinding method of carboxymethyl chitosan does not require solvents but requires a large amount of alkali to carry out the alkalization reaction, and the post-treatment process requires a large amount of organic solvents for washing and purification. The organic solvents used in the reaction must be recovered before they can be reused, which increases solvent recovery costs and sewage treatment costs, and increases energy consumption. Meanwhile, a single etherifying agent is used in the above reaction processes, and it is necessary to add an alkalizing agent or an etherifying agent several times to improve the etherification efficiency during the etherification. This replenishing process requires multiple-time manual operations, which is cumbersome.

2) The above modified chitosan is mainly used in the fields of food, medicine, cosmetics and papermaking water treatment, and there is no use in the field of building tile adhesive.

3) The above modification processes are all chemical modifications, and there is no physical modification process.

4) None of the above chemical modification processes adopts a dry process.

Therefore, it is an urgent problem to be solved for those skilled in the art that a method for preparing a modified chitosan by a simple process is provided.

SUMMARY

In view of this, an object of the present disclosure is to provide a modified chitosan, a preparation method thereof, and an adhesive of tile adhesive and use thereof. In the method for preparing the modified chitosan according to the present disclosure, chitosan, an inorganic base, a dispersant having a hydroxyl group and an etherifying agent are added at one time, which is a simple process, and is high in yield.

In order to achieve the above object of the disclosure, the present disclosure provides the following technical solutions:

The present disclosure provides a method for preparing a modified chitosan, including the following steps:

mixing a chitosan, an inorganic base, and a dispersant having a hydroxyl group, adding an etherifying agent thereto, and subjecting the resulting mixture to an etherification reaction to obtain the modified chitosan, wherein the etherification reaction comprises a first etherification reaction, a second etherification reaction, and a third etherification reaction;

the first etherification reaction is performed at a temperature of 20-35° C., a pressure of 0.05-0.1 MPa for 2.5-3.5 h;

the second etherification reaction is performed at a temperature of 40-50° C., a pressure of 0.11-0.18 MPa for 2.0-3.0 h; and the third etherification reaction is performed at a temperature of 55-65° C., a pressure of 0.21-0.28 MPa for 2.0-3.0 h.

In some embodiments, the inorganic base comprises one or more of sodium hydroxide, potassium hydroxide, lithium hydroxide, and barium hydroxide.

In some embodiments, the dispersant having a hydroxyl group comprises one or more of methanol, ethanol, isopropanol, n-butanol, t-butanol, ethylene glycol, and diethylene glycol.

In some embodiments, the etherifying agent comprises one or more of chloroacetic acid, propylene oxide, and ethylene oxide.

In some embodiments, a mass ratio of the chitosan, the inorganic base, the dispersant having a hydroxyl group, and the etherifying agent is in the range of 1:(0.02-1.75):(0.1-2.0):(0.01-2.0).

In some embodiments, the method further including adding a regulator, and a mass ratio of the chitosan to the regulator is not less than 10, wherein the regulator includes sodium sulfate, sodium sulfite, sodium chloride, or sodium carbonate.

The present disclosure also provides a modified chitosan prepared by the method as described in the above technical solutions, wherein the modified chitosan is chitosan ether, and the modified chitosan has a particle size of 0.125-0.180 mm.

The present disclosure also provides an additive for a tile adhesive, comprising the following components, in percentages by mass, 5-35% of the modified chitosan as described in the above technical solutions, 42-93% of a cellulose ether, 1-15% of a starch ether, 0.5-5% of an enhancer, and 0.5-3% of a rheological agent.

In some embodiments, it comprises the following components, in percentages by mass, 10-30% of the modified chitosan as described in the above technical solutions, 52-83% of the cellulose ether, 5-10% of the starch ether, 1-5% of the enhancer, and 1-3% of the rheological agent.

The present disclosure also provides use of the additive for a tile adhesive as described in the above technical solutions in a tile adhesive, wherein the additive for a tile adhesive accounts for 0.2-0.5% of the mass of the tile adhesive.

The present disclosure provides a method for preparing modified chitosan, including the following steps: mixing a chitosan, an inorganic base, and a dispersant having a hydroxyl group, adding an etherifying agent thereto, and subjecting the resulting mixture to an etherification reaction to obtain the modified chitosan, wherein the etherification reaction comprises a first etherification reaction, a second etherification reaction, and a third etherification reaction; the first etherification reaction is performed at a temperature of 20-35° C., a pressure of 0.05-0.1 MPa for 2.5-3.5 h; the second etherification reaction is performed at a temperature of 40-50° C., a pressure of 0.11-0.18 MPa for 2.0-3.0 h; the third etherification reaction is performed at a temperature of 55-65° C., a pressure of 0.21-0.28 MPa for 2.0-3.0 h. In the present disclosure, all of the chitosan, the inorganic base, the dispersant having a hydroxyl group and the etherifying agent are added to the system at one time, avoiding the tedious operations of adding inorganic alkali or etherifying agent multiple times. In addition, the etherification reaction is continuously carried out under the conditions of gradual temperature increase and pressure increase, which improves the uniformity of the product, improves the etherification efficiency of the etherifying agent, and reduces the production cost.

Furthermore, in the present disclosure, the amount of inorganic base used is increased, which increases the forward reaction rate of the chitosan-participating etherification reaction, and improves the etherification efficiency and product yield. Meanwhile, in the present disclosure, the etherifying agent is a mixture of multiple kinds of etherifying agents and they reacts at different temperatures and pressures, which further improves the etherification efficiency and product yield of each etherifying agent at various temperatures and pressures.

The present disclosure also provides a modified chitosan prepared by the method as described in the above technical solutions. The modified chitosan is a chitosan ether. When used for additives for tile adhesive, the modified chitosan forms a uniform network structure after being dispersed in the water, which improves the water retention capacity of the tile adhesive, thereby creating a significant bridging effect on the cement particles in the tile adhesive, imparting a greater mechanical anchoring force to the mortar slurry in the tile adhesive, thereby improving the tensile bonding strength of the tile adhesive.

The present disclosure also provides an additive for a tile adhesive, comprising the following components, in percentages by mass, 5-35% of the modified chitosan as described in the above technical solutions, 42-93% of the cellulose ether, 1-15% of the starch ether, 0.5-5% of the enhancer and 0.5-3% of the rheological agent. In the additive for a tile adhesive of the present disclosure, the modified chitosan, the cellulose ether, the starch ether, the strengthening agent and the rheological agent are combined, so that the additive for a tile adhesive forms a uniform network structure after being dispersed in water. After being used for a tile adhesive, it could further improve the water retention capacity of the tile adhesive, produce a significant bridging effect on the cement particles in the tile adhesive, impart a greater mechanical anchoring force to the tile adhesive, and improve the tensile bonding strength of the tile adhesive.

DETAILED DESCRIPTION OF THE EMBODIMENTS

The present disclosure provides a method for preparing a modified chitosan, including the following steps:
mixing a chitosan, an inorganic base, and a dispersant having a hydroxyl group, adding an etherifying agent thereto and subjecting the resulting mixture to an etherification reaction to obtain the modified chitosan,
wherein the etherification reaction comprises a first etherification reaction, a second etherification reaction, and a third etherification reaction;
the first etherification reaction is performed at a temperature of 20-35° C., a pressure of 0.05-0.1 MPa for 2.5-3.5 h;
the second etherification reaction is performed at a temperature of 40-50° C., a pressure of 0.11-0.18 MPa for 2.0-3.0 h; and
the third etherification reaction is performed at a temperature of 55-65° C., a pressure of 0.21-0.28 MPa for 2.0-3.0 h.

In the present disclosure, after mixing chitosan, the inorganic base and the dispersant having a hydroxyl group, the etherifying agent is added thereto, and the resulting mixture is subjected to an etherification reaction to obtain the modified chitosan.

In some embodiments of the present disclosure, the chitosan is a chitosan with a degree of deacetylation of 55-99%, preferably a chitosan with a degree of deacetylation of 70-97%, and more preferably a chitosan with a degree of deacetylation of 85.2-95.3%. In some embodiments, the chitosan powder has a molecular weight of 10,000-200,000, and preferably 30,000-150,000. In some embodiments, the chitosan has a particle size of 0.18-0.30 mm, and preferably 0.212-0.250 mm. In the present disclosure, chitosan is used as the main reaction raw material and has a macromolecular linear structure, which has the effect of retaining moisture. In the present disclosure, the chitosan is adjusted to a degree of deacetylation of 55-99%, a molecular weight of 10,000-200,000, and a particle size of 0.18-0.30 mm, so that chitosan could easily penetrate in the etherification reaction system and exhibit good solubility and reactivity, and the discharge is smooth after the etherification reaction.

In some embodiments of the present disclosure, the inorganic base includes one or more of sodium hydroxide, potassium hydroxide, lithium hydroxide, and barium hydroxide, preferably is sodium hydroxide, potassium hydroxide or barium hydroxide, and more preferably is sodium hydroxide. In some embodiments, the inorganic base has a particle size of 0.125-0.15 mm. In the present disclosure, the inorganic base is easy to be fully mixed with other etherification reaction materials, and exhibits high solubility and dissolution rate, which allows the etherification reaction to proceed fully and improve the efficiency of etherification. In addition, the inorganic base could increase the concentration of lye in the etherification reaction system and accelerate the rate of the etherification reaction. Further, in the present disclosure, the particle size of the inorganic base is adjusted to 0.125-0.15 mm, which improves the permeability of the inorganic base and accelerates the etherification reaction rate.

In the present disclosure, the dispersant having a hydroxyl group includes one or more of methanol, ethanol, isopropanol, n-butanol, tert-butanol, ethylene glycol, and diethylene glycol, and preferably is ethanol or isopropyl alcohol. In the present disclosure, the dispersant having a hydroxyl group exhibits good fluidity at room temperature, which is good for pumping, and meanwhile functions as an inert solvent, and does not participate in the reaction, but it could be fully mixed with the materials, improving the uniformity of the reaction, and improving the product quality.

In some embodiments of the present disclosure, the etherifying agent includes one or more of chloroacetic acid, propylene oxide, and ethylene oxide. In the present disclosure, the etherifying agent could be used to replace the hydroxyl group on the chitosan to obtain a chitosan ether product, which could improve the hydrophilicity and solubility of the modified chitosan.

In some embodiments of the present disclosure, a mass ratio of the chitosan, the inorganic base, the dispersant having a hydroxyl group, and etherifying agent is preferably 1:(0.02-1.75):(0.1-2.0):(0.01-2.0), and preferably 1:(0.02-0.8):(0.2-1.0):(0.36-1.0).

In some embodiments of the present disclosure, the method further includes adding a regulator. In some embodiments, the regulator includes one or more of sodium sulfate, sodium sulfite, sodium chloride, and sodium carbonate, preferably sodium sulfate, sodium chloride, or sodium carbonate, and preferably sodium sulfate. In some embodiments of the present disclosure, the timing of adding the regulator is when the chitosan, the inorganic base, and the dispersant having a hydroxyl group are mixed. In some embodiments of the present disclosure, a mass ratio of the chitosan to the regulator is not less than 10, and preferably 10-20. In the present disclosure, the regulator allows that the reaction material does not hold together, and meanwhile serves as a moisture regulator for the final product—the modified chitosan, which is more conducive to discharging.

In the present disclosure, the etherification reaction includes a first etherification reaction, a second etherification reaction, and a third etherification reaction that are sequentially performed.

In the present disclosure, the first etherification reaction is performed at a temperature of 20-35° C., and preferably 25-30° C. The first etherification reaction is performed at a pressure of 0.05-0.1 MPa, preferably 0.06-0.09 MPa, and more preferably 0.07-0.08 MPa. The first etherification reaction is performed for 2.5-3.5 h, and preferably 3.0 h.

In the present disclosure, the second etherification reaction is performed at a temperature of 40-50° C., and preferably 45° C. The second etherification reaction is performed at a pressure of 0.11-0.18 MPa, preferably 0.12-0.17 MPa, more preferably 0.13-0.16 MPa, and further more preferably 0.14-0.15 MPa. The second etherification reaction is performed for 2.0-3.0 h, and preferably 2.5 h.

In the present disclosure, the third etherification reaction is performed at a temperature of 55-65° C., and preferably 60° C. The third etherification reaction is performed at a pressure of 0.21-0.28 MPa, preferably 0.22-0.27 MPa, more preferably 0.23-0.26 MPa, and further more preferably 0.24-0.25 MPa. The third etherification reaction is performed for 2.0-3.0 h, and preferably 2.5 h.

In some embodiments of the present disclosure, the etherification reaction is carried out in a reactor equipped with a jacket and a stirrer. In some embodiments, the specific process of the etherification reaction is described below in conjunction with the reactor for the etherification reaction, which includes the following steps:

adding the chitosan, the inorganic base, and the dispersant having a hydroxyl group into the reactor, evacuating the reactor, and purging with nitrogen to remove oxygen, evacuating the reactor again, and adding an etherifying agent into the reactor, and subjecting the resulting mixture to an etherification reaction.

In some embodiments of the present disclosure, the method further includes after the etherification reaction, condensing and recovering the unreacted dispersant having a hydroxyl group and etherifying agent in the etherification reaction system, and drying the remaining product after recovery, and pulverizing the dried product, to obtain the modified chitosan.

In some embodiments of the present disclosure, the condensation and recovery are performed at a steam pressure of 0-0.04 MPa, a temperature of 72-82° C. for 0.5-2.5 h.

In some embodiments of the present disclosure, the drying is performed at a temperature of 50-90° C., and preferably 60-80° C. In the present disclosure, there is no special limitation on the time for drying, as long as the moisture content in the dried material is not more than 10%.

In the present disclosure, there is no special limitation on the pulverization parameters, as long as the remaining product after recovery could be pulverized to a particle size of 0.125-0.180 mm. In the present disclosure, the pulverization could reduce the roughness of the modified chitosan, increase the fineness and bulk density of the modified chitosan, and meanwhile make the modified chitosan have better fluidity and texture, and is easy to package.

In the present disclosure, after the etherification reaction is completed, the etherifying agent and the dispersant having a hydroxyl group are recovered, which could reduce the consumption of the etherifying agent and the dispersant having a hydroxyl group, and reduce the production cost. Also, the pressure relief process of the reactor is smoother, safer and environmentally friendly.

In the present disclosure, the preparation process from raw material (chitosan) to product (modified chitosan) requires only a very small amount of solvent, i.e. a dispersant having a hydroxyl group. The water in chitosan serves as the solvent of inorganic alkali. Without washing, the process avoids the use of a large amount of solvents and water in the preparation of chitosan ethers by the traditional liquid phase method, which greatly reduces the cost of solvent recovery, and does not require a sewage treatment system, which avoids the cost of sewage treatment. The etherifying agent and the dispersant having a hydroxyl group are recovered and reused after condensation, saving resources. The etherification reaction is carried out step by step under the conditions of gradual temperature increase and pressure increase, which improves the uniformity of the product, further improves the etherification efficiency of the etherifying agent and reduces the production cost. Meanwhile, the entire etherification reaction process is carried out under the conditions of 0.05-0.28 MPa, which ensures the safety of the etherification reaction, greatly shortens the preparation time of modified chitosan, and avoids the discharging of three wastes, and thus it is green and environmentally friendly.

The present disclosure also provides a modified chitosan prepared by the method as described in the above technical solutions, wherein the modified chitosan is a chitosan ether, and the modified chitosan has a particle size of 0.125-0.180 mm. In the present disclosure, when the modified chitosan is uses in an additive for a tile adhesive, it could improve the tensile bonding strength of the tile adhesive.

The present disclosure also provides an additive for a tile adhesive, comprising the following components, in percentages by mass, 5-35% of the modified chitosan as described in the above technical solutions, 42-93% of a cellulose ether, 1-15% of a starch ether, 0.5-5% of an enhancer, and 0.5-3% of a rheological agent.

The additive for a tile adhesive according to the present disclosure includes 5-35% by mass of the modified chitosan as described in the above technical solutions, preferably 10-30%, more preferably 15-25%, and further more preferably 20%. In the present disclosure, the modified chitosan has various kinds of hydrophilic groups, such as carboxymethyl, hydroxypropyl, and hydroxyethyl, and has cationic amino basic groups, which has good compatibility with cellulose ethers and starch ethers, and has a synergistic effect together with the linear structure of cellulose ether(s) and the branched structure of starch ether(s) in improving the water retention capacity of the tile adhesive, thereby improving the bonding performance of the tile adhesive and extending the open time of the tile adhesive to a certain extent. Further, the hydrophilic group of the modified chitosan increases the steric hindrance of the additives for a tile adhesive, and improves the anti-slip performance of the tile adhesive to a certain extent.

Based on the mass percentage of the modified chitosan as described in the above technical solutions, the additive for a tile adhesive according to the present disclosure includes 42-93% by mass of a cellulose ether, preferably 52-83%, and more preferably 63-82%. In some embodiments of the present disclosure, the cellulose ether is one or more of monobasic cellulose ether, dibasic cellulose ether, and ternary cellulose ether, and preferably dibasic cellulose ether. In some embodiments of the present disclosure, the monobasic cellulose ether is carboxymethyl cellulose, methyl cellulose, ethyl cellulose, hydroxypropyl cellulose or hydroxyethyl cellulose. In some embodiments, the dibasic cellulose ether is hydroxypropyl methyl cellulose, hydroxyethyl methyl cellulose, carboxymethyl hydroxypropyl cellulose, hydroxypropyl hydroxyethyl cellulose, hydroxypropyl ethyl cellulose or carboxymethyl hydroxyethyl cellulose, preferably hydroxypropyl methyl cellulose or hydroxyethyl methyl cellulose. In some embodiments, the ternary cellulose ether is carboxymethyl hydroxypropyl hydroxyethyl cellulose, hydroxypropyl hydroxyethyl ethyl cellulose or hydroxypropyl hydroxyethyl methyl cellulose. In some embodiments of the present disclosure, the source of the cellulose ether is a commercially available product. In the present disclosure, the cellulose ether could have a synergistic effect together with the linear structure of the modified chitosan ether and the branched structure of the starch ether in improving the water retention capacity of the tile adhesive, thereby improving the bonding performance of the tile adhesive. Meanwhile, the selected cellulose ether has both hydrophobic and hydrophilic groups and has air-entraining properties, which could improve the workability of the tile adhesive during the construction process and improve the construction quality.

Based on the mass percentage of the modified chitosan as described in the above technical solutions, the additive for a tile adhesive according to the present disclosure includes 1-15% by mass of a starch ether, preferably 5-10%. In some embodiments of the present disclosure, the starch ether is one or more of a monobasic starch ether, a binary starch ether, and a tertiary starch ether. In some embodiments, the monobasic starch ether is carboxymethyl starch, hydroxypropyl starch, or hydroxyethyl starch. In some embodiments, the binary starch ether is carboxymethyl hydroxypropyl starch, hydroxypropyl hydroxyethyl starch or carboxymethyl hydroxyethyl starch. In some embodiments, the ternary starch ether is carboxymethyl hydroxypropyl hydroxyethyl starch, hydroxypropyl hydroxyethyl ethyl starch, or hydroxypropyl hydroxyethyl methyl starch. When the starch ether is a mixture, in the present disclosure, there is no special limitation on the weight ratio among substances in the mixture, and any weight ratio may be used. In some embodiments of the present disclosure, the source of the starch ether is a commercially available product. The starch ether selected in the present disclosure contains various kinds of hydrophilic groups, such as hydroxypropyl, hydroxyethyl, and carboxymethyl, which increases the content of branched substituent groups and could have a synergistic effect together with the linear structures of modified chitosan and cellulose ether in improving the water retention capacity of the tile adhesive, thereby prolonging the open time of the tile adhesive. Meanwhile, various kinds of branched chain substituents of starch ether such as hydroxypropyl, hydroxyethyl and carboxymethyl increase the steric hindrance of the tile adhesive and improve the anti-slip performance of the tile adhesive.

Based on the mass percentage of the modified chitosan as described in the above technical solutions, the additive for a tile adhesive according to the present disclosure includes 0.5-5% by mass of a reinforcing agent, preferably 1-5%, and more preferably 2-4%. In some embodiments of the present disclosure, the reinforcing agent is one or more of an anionic polyacrylamide, a cationic polyacrylamide, a non-ionic polyacrylamide, sodium alginate, polyvinyl alcohol, and polyethylene oxide. When the enhancer is a mixture, in the present disclosure, there is no special limitation on the weight ratio among substances in the mixture, and any weight ratio may be used. In the present disclosure, the reinforcing agent may enhance the adhesive bonding strength of the tile adhesive. The reinforcing agents selected in the present disclosure have excellent water solubility, and good compatibility with the modified chitosan, the cellulose ether, and the starch ether, and could improve the water retention of cement slurry in the tile adhesive, meanwhile greatly improve the transportability of the cement slurry in the tile adhesive, and could inhibit the flying of dust and improve the production environment.

Based on the mass percentage of the modified chitosan as described in the above technical solutions, the additive for the tile adhesive according to the present disclosure includes 0.5-3% by mass of a rheological agent, preferably 1-3%, more preferably 1.5-2.5%, and further more preferably 2.0%. In some embodiments of the present disclosure, the rheological agent is one or more of guar gum, sesbania gum, arabic gum, linseed gum, carrageenan, and xanthan gum. When the rheological agent in the present disclosure is a mixture, the weight ratio among substances in the mixture is not specifically limited, and any weight ratio may be used. In the present disclosure, the rheological agent has the functions of adjusting the viscosity of the additive for a tile adhesive and synergistically improving the stability of the tile additive together with other components. The rheological agents selected in the present disclosure have excellent water solubility and good compatibility with the modified chitosan, the cellulose ether and the starch ether, could improve the water retention of cement slurry in the tile adhesive, and enhance the stability of the cement slurry in the tile adhesive to heat, acid, alkali, enzyme and salt.

In some embodiments of the present disclosure, the method for preparing the additive for a tile adhesive includes the following steps:

mixing the modified chitosan, the cellulose ether, the starch ether, the strengthening agent and the rheological agent to obtain the additive for a tile adhesive.

In some embodiments of the present disclosure, the means for mixing is a stirring. In some embodiments, the stirring is performed at a rotation speed of 10-70 r/min. In some embodiments, the stirring is performed for 40-60 min. In the present disclosure, the mixing allows the modified chitosan, the cellulose ether, the starch ether, the strengthening agent and the rheological agent to be uniformly mixed to obtain a uniformly-mixed additive for a tile adhesive.

The present disclosure also provides use of the additive for a tile adhesive as described in the above solutions in a tile adhesive, wherein the additive for a tile adhesive accounts for 0.2-0.5% of the mass of the tile adhesive. In the present disclosure, there is no special limitation on other raw materials in the tile adhesive, and only the raw materials well-known to those skilled in the art may be used.

The modified chitosan, the preparation method thereof, the additives for a tile adhesive and use thereof according to the present disclosure will be described in detail below with reference to examples, but they should not be understood as limiting the scope of the present disclosure.

In the following examples and comparative examples, the viscosity of hydroxypropyl methyl cellulose was determined by measuring the viscosity (wet viscosity) of 2% aqueous solution at 20° C. with a B-type RVT viscometer, referred as 2%/B-type RVT/viscosity, and the viscosity of the modified chitosan and the starch ether was determined by measuring the viscosity (dry viscosity) of 5% aqueous solution at 20° C. with a B-type LVT viscometer, referred as 5%/B-type LVT/viscosity.

Example 1

100 kg of chitosan powder (with a degree of deacetylation of 86.3%, a molecular weight of 55,000 and a particle size of 0.230 mm), 12 kg of sodium hydroxide powder (with a particle size of 0.13 mm), and 30 kg isopropanol were sequentially added to a jacketed, stirring reactor with a pressure of 0.9 MPa. The reactor was evacuated and purged with nitrogen to remove oxygen, and then evacuated again. 17 kg of chloroacetic acid, 26 kg of propylene oxide, and 1 kg of ethylene oxide, i.e. the etherifying agents, were sequentially added to the reactor. The temperature was increased to 25° C., and the pressure was 0.06 MPa, and under such conditions the first etherification reaction was carried out for 3.0 h. The temperature was further increased to 45° C., and the pressure was 0.13 MPa, and under such conditions the second etherification reaction was carried out for 2.5 h. The temperature was further increased to 60° C., and the pressure was 0.25 MPa, and under such conditions the third etherification reaction was carried out for 2.5 h.

Figure 1:
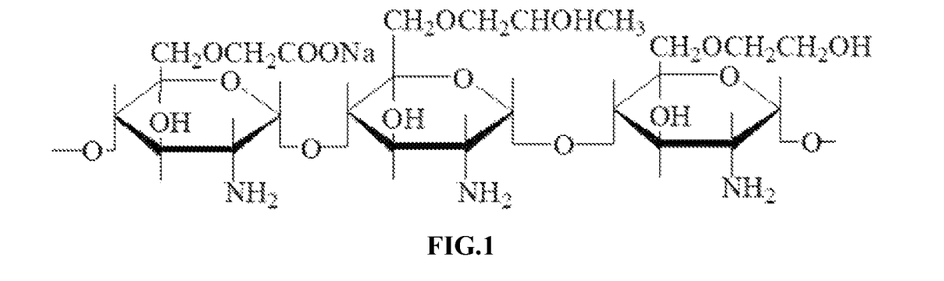
FIG. 1 shows a structural diagram of the modified chitosan obtained in Example 1.

After the reaction, the unreacted alcohol and etherifying agent were condensed and recovered, and the pressure was released to 0.01 MPa. The reaction product was dried at a temperature of 60° C. for 2 h, and the dried product was pulverized to a particle size of 0.15 mm to obtain a modified chitosan, i.e. carboxymethyl hydroxypropyl hydroxyethyl chitosan, abbreviated as HPHECMCTS, with a yield of 95.53%. Its structure is shown in FIG. 1.

20 kg of the modified chitosan, 69 kg of hydroxypropyl methylcellulose (with a methoxy content of 28.7%, a hydroxypropoxy content of 8.3%, a 2%/B-type RVT/viscosity of 62,500 cp, and ash content of 4.5%, produced by Shandong Yiteng New Material Co., Ltd., China), 5 kg of hydroxypropyl starch (with a hydroxypropoxy content of 19.6%, a 5%/B-type LVT/viscosity of 1,900 cp, and ash content of 7.5%, produced by Shandong Yiteng New Material Co., Ltd., China), 3 kg of anionic polyacrylamide and 3 kg of guar gum were weighed, added into a mixer, and mixed and stirred at a speed of 50 r/min for 50 min to obtain the additive for a tile adhesive.

Example 2

Figure 2:
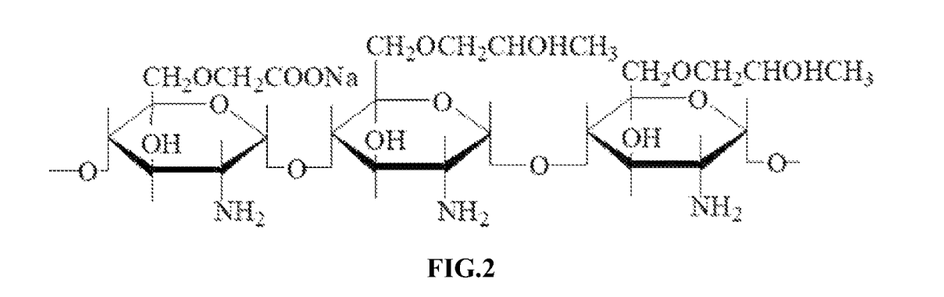
FIG. 2 shows a structural diagram of the modified chitosan obtained in Example 2.

100 kg of chitosan powder (with a degree of deacetylation of 90.5%, a molecular weight of 35,000, and a particle size of 0.240 mm), 16 kg of sodium hydroxide powder (with a particle size of 0.125 mm), and 20 kg of ethanol were sequentially added to a jacketed, stirring reactor with a pressure of 0.9 MPa. The reactor was evacuated and purged with nitrogen to remove oxygen, and then evacuated again. 21 kg of chloroacetic acid and 25 kg of propylene oxide, i.e. the etherifying agents, were sequentially added to the reactor. The temperature was increased to 30° C., and the pressure was 0.07 MPa, and under such conditions the first etherification reaction was carried out for 3.5 h. The temperature was slowly increased to 50° C., and the pressure was 0.15 MPa, and under such conditions the second etherification reaction was carried out for 2.0 h. The temperature was further increased to 65° C., and the pressure was 0.28 MPa, and under such conditions the third etherification reaction was carried out for 2.0 h. After the reaction, the unreacted alcohol and etherifying agent were condensed and recovered, and the pressure was released to 0.02 MPa. The reaction product was dried at a temperature of 65° C. for 1.5 h, and the dried product was pulverized to a particle size of 0.125 mm to obtain a modified chitosan, i.e. carboxymethyl hydroxypropyl chitosan, abbreviated as HPCMCTS, with a yield of 96.16%. Its structure is shown in FIG. 2.

25 kg of the modified chitosan, 63 kg of hydroxypropyl methylcellulose (with a methoxy content of 28.5%, a hydroxypropoxy content of 8.5%, a 2%/B-type RVT/viscosity of 73,200 cp, and ash content of 4.4%, produced by Shandong Yiteng New Material Co., Ltd., China), 5 kg of hydroxypropyl starch (with a hydroxypropoxy content of 19.5%, a 5%/B-type LVT/viscosity of 1,950 cp, and ash content of 7.6%, produced by Shandong Yiteng New Material Co., Ltd., China), 5 kg of cationic polyacrylamide, and 2 kg of sesbania gum were weighed, added into a mixer, and mixed and stirred at a speed of 30 r/min for 50 min to obtain the additive for a tile adhesive.

Example 3

Figure 3:
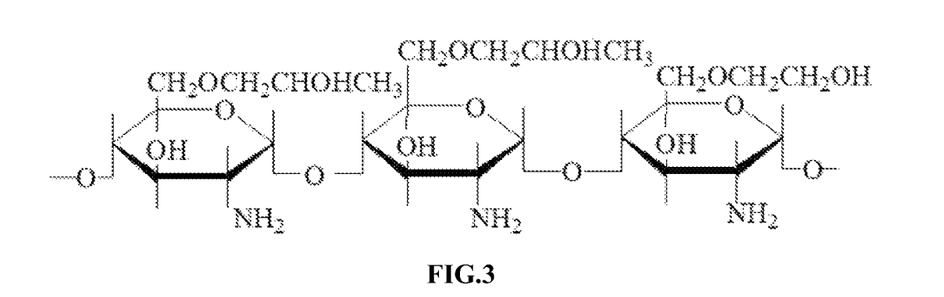
FIG. 3 shows a structural diagram of the modified chitosan obtained in Example 3.

100 kg of chitosan powder (with a degree of deacetylation of 95.3%, a molecular weight of 30,000, and a particle size of 0.250 mm), 2 kg of sodium hydroxide powder (with a particle size of 0.14 mm), 10 kg of $Na_2SO_4$ and 50 kg of isopropanol were sequentially added to a jacketed, stirring reactor with a pressure of 0.9 MPa. The reactor was evacuated and purged with nitrogen to remove oxygen, and then evacuated again. 34 kg of propylene oxide and 6 kg of ethylene oxide, i.e. the etherifying agents, were sequentially added to the reactor. The temperature was increased to 20° C., and the pressure was 0.05 MPa, and under such conditions the first etherification reaction was carried out for 2.5 h. The temperature was slowly increased to 40° C., and the pressure was 0.11 MPa, and under such conditions the second etherification reaction was carried out for 3.0 h. The temperature was further increased to 55° C., and the pressure was 0.22 MPa, and under such conditions the third etherification reaction was carried out for 3.0 h. After the reaction, the unreacted alcohol and etherifying agent were condensed and recovered, and the pressure was released to 0.01 MPa. The reaction product was dried at a temperature of 70° C. for 1.5 h, and the dried product was pulverized to a particle size of 0.18 mm to obtain a modified chitosan, i.e. hydroxypropyl hydroxyethyl chitosan, abbreviated as HPHECTS, with a yield of 92.14%. Its structure is shown in FIG. 3.

30 kg of the modified chitosan, 60 kg of hydroxyethyl methylcellulose (with a methoxy content of 27.7%, a hydroxyethyl content of 9.2%, a 2%/B-type RVT/viscosity of 81,600 cp, and ash content of 4.3%, produced by Shandong Yiteng New Material Co., Ltd., China), 5 kg of hydroxypropyl starch (with a hydroxypropoxy content of 18.5%, a 5%/B-type LVT/viscosity of 2,450 cp, and ash content of 7.8%, produced by Shandong Yiteng New Material Co., Ltd., China), 4 kg of nonionic polyacrylamide, and 1 kg of arabic gum were weighed, added into a mixer, and mixed and stirred at a speed of 70 r/min for 40 min to obtain the additive for a tile adhesive.

Example 4

Figure 4:
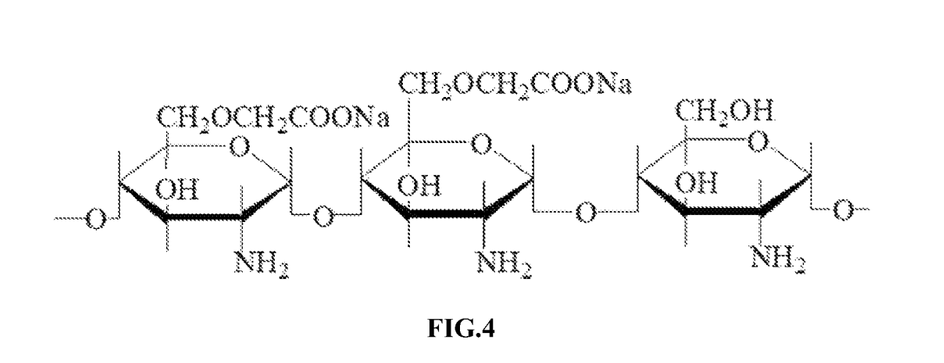
FIG. 4 shows a structural diagram of the modified chitosan obtained in Example 4.

100 kg of chitosan powder (with a degree of deacetylation of 85.2%, a molecular weight of 150,000, and a particle size of 0.215 mm), 57 kg of sodium hydroxide powder (with a particle size of 0.15 mm), and 80 kg of ethanol were sequentially added to a jacketed, stirring reactor with a pressure of 0.9 MPa. The reactor was evacuated and purged with nitrogen to remove oxygen, and then evacuated again. 78 kg of chloroacetic acid, i.e. the etherifying agent, was added to the reactor. The temperature was increased to 35° C., and the pressure was 0.1 MPa, and under such conditions the first etherification reaction was carried out for 2.5 h. The temperature was slowly increased to 50° C., and the pressure was 0.18 MPa, and under such conditions the second etherification reaction was carried out for 2.0 h. The temperature was increased to 65° C., and the pressure was 0.27 MPa, and under such conditions the third etherification reaction was carried out for 2.0 h. After the reaction, the unreacted ethanol was condensed and recovered, and the pressure was released to 0 MPa (gauge pressure). The reaction product was dried at a temperature of 90° C. for 0.5 h, and the dried product was pulverized to a particle size of 0.17 mm to obtain a modified chitosan, i.e. carboxymethyl chitosan, abbreviated as CMCTS, with a yield of 98.63%. Its structure is shown in FIG. 4.

15 kg of the modified chitosan, 72 kg of hydroxyethyl methylcellulose (with a methoxy content of 28.3%, a hydroxyethyl content of 8.7%, a 2%/B-type RVT/viscosity of 55,300 cp, and ash content of 4.6%, produced by Shandong Yiteng New Material Co., Ltd., China), 10 kg of hydroxypropyl starch (with a hydroxypropoxy content of 20.3%, a 5%/B-type LVT/viscosity of 2,350 cp, and ash content of 8.3%, produced by Shandong Yiteng New Material Co., Ltd., China), 1 kg of sodium alginate, and 2 kg of linseed gum were weighed, added into a mixer, and mixed and stirred at a speed of 10 r/min for 60 min to obtain the additive for a tile adhesive.

Example 5

Figure 5:
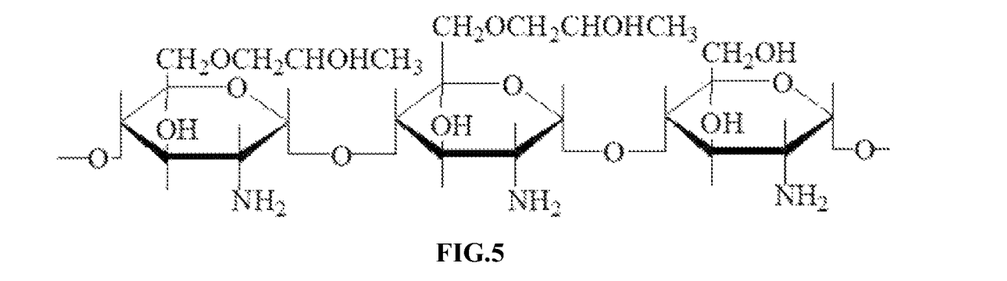
FIG. 5 shows a structural diagram of the modified chitosan obtained in Example 5.

100 kg of chitosan powder (with a degree of deacetylation of 90.1%, a molecular weight of 100,000, a particle size of 0.220 mm), 2.8 kg of potassium hydroxide powder (with a particle size of 0.135 mm), 5 kg of NaCl, and 100 kg of isopropanol were sequentially added to a jacketed, stirring reactor with a pressure of 0.9 MPa. The reactor was evacuated and purged with nitrogen to remove oxygen, and then evacuated again. 48 kg of propylene oxide, i.e. the etherifying agent, was added to the reactor. The temperature was increased to 30° C., and the pressure was 0.08 MPa, and under such conditions the first etherification reaction was carried out for 3.0 h. The temperature was increased to 45° C., and the pressure was 0.16 MPa, and under such conditions the second etherification reaction was carried out for 2.5 h. The temperature was slowly increased to 60° C., and the pressure was 0.24 MPa, and under such conditions the third etherification reaction was carried out for 2.5 h. After the reaction, the unreacted alcohol and etherifying agent were condensed and recovered, and the pressure was released to 0.02 MPa. The reaction product was dried at a temperature of 80° C. for 1 h, and the dried product was pulverized to a particle size of 0.16 mm to obtain a modified chitosan, i.e. hydroxypropyl chitosan, abbreviated as HPCTS, with a yield of 87.83%. Its structure is shown in FIG. 5.

10 kg of the modified chitosan, 77 kg of hydroxypropyl methylcellulose (with a methoxy content of 27.5%, a hydroxypropyl content of 9.3%, a 2%/B-type RVT/viscosity of 55,600 cp, and ash content of 4.2%, produced by Shandong Yiteng New Material Co., Ltd., China), 10 kg of hydroxypropyl starch (with a hydroxypropoxy content of 20.5%, a 5%/B-type LVT/viscosity of 2,100 cp, and ash content of 8.1%, produced by Shandong Yiteng New Material Co., Ltd., China), 2 kg of polyvinyl alcohol, and 1 kg of carrageenan were weighed, added into a mixer, and mixed and stirred at a speed of 20 r/min for 55 min to obtain the additive for a tile adhesive.

Example 6

Figure 6:
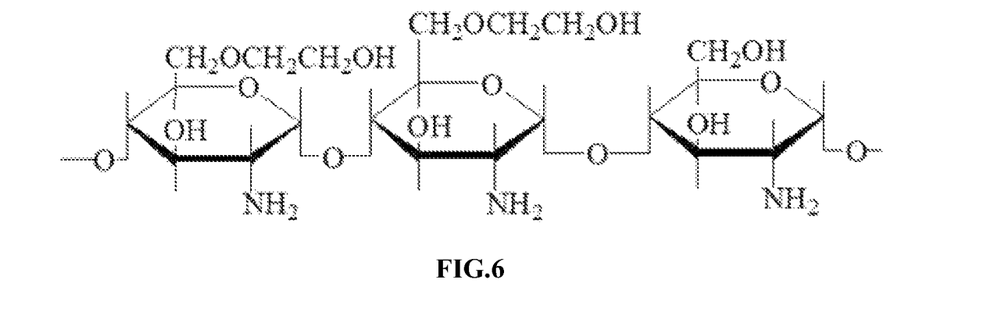
FIG. 6 shows a structural diagram of the modified chitosan obtained in Example 6.

100 kg of chitosan powder (with a degree of deacetylation of 95.2%, a molecular weight of 50,000, and a particle size of 0.235 mm), 4.3 kg of barium hydroxide powder (with a particle size of 0.145 mm), 5 kg of $Na_2CO_3$ and 70 kg of ethanol were sequentially added to a jacketed, stirring reactor with a pressure of 0.9 MPa. The reactor was evacuated and purged with nitrogen to remove oxygen, and then evacuated again. 36 kg of ethylene oxide, i.e. the etherifying agent, was added to the reactor. The temperature was increased to 20° C., and the pressure was 0.05 MPa, and under such conditions the first etherification reaction was carried out for 3.5 h. The temperature was further increased to 40° C., and the pressure was 0.12 MPa, and under such conditions the second etherification reaction was carried out for 3.0 h. The temperature was further increased to 55° C., and the pressure was 0.21 MPa, and under such conditions the third etherification reaction was carried out for 3.0 h. After the reaction, the unreacted alcohol and etherifying agent were condensed and recovered, and the pressure was released to 0.01 MPa. The reaction product was dried at a temperature of 50° C. for 2.5 h, and the dried product was pulverized to a particle size of 0.14 mm to obtain a modified chitosan, i.e. hydroxyethyl chitosan, abbreviated as HECTS, with a yield of 90.45%. Its structure is shown in FIG. 6.

20 kg of the modified chitosan, 64 kg of hydroxyethyl methylcellulose (with a methoxy content of 27.8%, a hydroxyethyl content of 8.5%, a 2%/B-type RVT/viscosity of 63,500 cp, and ash content of 4.7%, produced by Shandong Yiteng New Material Co., Ltd., China), 10 kg of hydroxypropyl starch (with a hydroxypropoxy content of 18.7%, a 5%/B-type LVT/viscosity of 2,250 cp, and ash content of 7.9%, produced by Shandong Yiteng New Material Co., Ltd., China), 3 kg of polyethylene oxide, and 3 kg of xanthan gum were weighed, added into a mixer, and mixed and stirred at a speed of 40 r/min for 45 min to obtain the additive for a tile adhesive.

Comparative Example 1

1,300 kg of isopropanol was added to a jacketed, stirring reactor with a pressure of 0.6 MPa. Then 100 kg of chitosan powder (with a degree of deacetylation of 65%), and 33 kg of aqueous sodium hydroxide solution with a mass concentration of 50% were sequentially added thereto. The reactor was evacuated and purged with nitrogen to remove oxygen. The mixture was reacted at 40° C. for 6 h. The reactor was vented, and then the mixed chloroacetic acid-isopropanol solution (which was formed by mixing 16 kg of chloroacetic acid and 16 kg of isopropanol in advance) was sprayed into the reactor. After spraying, the temperature was increased to 50° C., and the resulting mixture was reacted for 3 h. The reactor was evacuated and purged with nitrogen to remove oxygen, and then evacuated again. 48 kg of propylene oxide was added to the reactor, and the resulting mixture was reacted at 50° C. for 10 h. Then the reactor was evacuated and purged with nitrogen to remove oxygen, and evacuated again. 4 kg of ethylene oxide was added to the reactor, and the reaction was continued at 50° C. for 10 h. The reactor was vented, and cooled to 40° C. The product mixture was centrifuged, and the isopropanol used in the reaction was introduced into a recovery system for recovery. After centrifugation, the resulting material was washed and centrifuged several times with an aqueous ethanol solution with a mass concentration of 85%, and the pH value was adjusted to neutral. Then the material was dried and crushed to obtain a modified chitosan, i.e. carboxymethyl hydroxypropyl hydroxyethyl chitosan, abbreviated as HPHECMCTS, with a yield of 59.39%.

30 kg of the modified chitosan and 70 kg of hydroxypropyl methylcellulose were weighed, added to a mixer, and then mixed and stirred for 50 min to obtain the additive for a tile adhesive.

Comparative Example 2

1,300 kg of isopropanol was added to a jacketed, stirring reactor with a pressure of 0.6 MPa. Then 100 kg of chitosan powder (with a degree of deacetylation of 65%), and 61 kg of aqueous sodium hydroxide solution with a mass concentration of 40% were sequentially added thereto. The reactor was evacuated and purged with nitrogen to remove oxygen. The mixture was reacted at 40° C. for 6 h. The reactor was vented, and then the mixed chloroacetic acid-isopropanol solution (which was formed by mixing 19 kg of chloroacetic acid and 19 kg of isopropanol in advance) was sprayed into the reactor. After spraying, the temperature was increased to 50° C., and the resulting mixture was reacted for 3 h. The reactor was evacuated and purged with nitrogen to remove oxygen, and then evacuated again. 54 kg of propylene oxide was added to the reactor, and reacted at 50° C. for 24 h. Then the reactor was vented, and cooled to 40° C. The product mixture was centrifuged, and the isopropanol used in the reaction was introduced into a recovery system for recovery. After centrifugation, the resulting material was washed and centrifuged several times with an aqueous ethanol solution with a mass concentration of 85%, and the pH value was adjusted to neutral. Then the material was dried and crushed to obtain a modified chitosan, i.e. carboxymethyl hydroxypropyl chitosan, abbreviated as HPCMCTS, with a yield of 60.25%.

30 kg of the modified chitosan and 70 kg of hydroxypropyl methylcellulose were weighed, added to a mixer, and then mixed and stirred for 50 min to obtain the additive for a tile adhesive.

Comparative Example 3

1,300 kg of isopropanol was added to a jacketed, stirring reactor with a pressure of 0.6 MPa. Then 100 kg of chitosan powder (with a degree of deacetylation of 65%), and 48 kg of aqueous sodium hydroxide solution with a mass concentration of 45% were sequentially added thereto. The reactor was evacuated and purged with nitrogen to remove oxygen. The mixture was reacted at 40° C. for 6 h. The reactor was evacuated and purged with nitrogen to remove oxygen, and then evacuated again. 63 kg of propylene oxide was added to the reactor, and the resulting mixture was reacted at 50° C. for 12 h. The reactor was evacuated and purged with nitrogen to remove oxygen, and then evacuated again. 9 kg of ethylene oxide was added to the reactor, and the reaction was continued at 50° C. for 12 h. The reactor was vented, and cooled to 40° C. The product mixture was centrifuged, and the isopropanol used in the reaction was introduced into a recovery system for recovery. After centrifugation, the resulting material was washed and centrifuged several times with an aqueous ethanol solution with a mass concentration of 85%, and the pH value was adjusted to neutral. Then the material was dried and crushed to obtain a modified chitosan, i.e. hydroxypropyl hydroxyethyl chitosan, abbreviated as HPHECTS, with a yield of 54.73%.

30 kg of the modified chitosan and 70 kg of hydroxypropyl methylcellulose were weighed, added to a mixer, and then mixed and stirred for 50 min to obtain the additive for a tile adhesive.

Comparative Example 4

1,300 kg of isopropanol was added to a jacketed, stirring reactor with a pressure of 0.6 MPa. Then 100 kg of chitosan powder (with a degree of deacetylation of 65%), and 127 kg of aqueous sodium hydroxide solution with a mass concentration of 45% were sequentially added thereto. The reactor was evacuated and purged with nitrogen to remove oxygen. The mixture was reacted at 40° C. for 6 h. The reactor was evacuated and purged with nitrogen to remove oxygen, and then evacuated again. The mixed chloroacetic acid-isopropanol solution (which was formed by mixing 25 kg of chloroacetic acid with 25 kg of isopropanol in advance) was sprayed into the reactor. After spraying, the temperature was increased to 50° C., and the mixture was reacted for 10 h. Then the reactor was evacuated and purged with nitrogen to remove oxygen, and then evacuated again. The mixed chloroacetic acid-isopropanol solution (which is formed by mixing with 25 kg of chloroacetic acid and 25 kg of isopropanol in advance) was sprayed into the reactor. After spraying, the reaction was continued at 50° C. for 12 h. The reactor was vented, and cooled to 40° C. The product mixture was centrifuged. The isopropanol used in the reaction was introduced into a recovery system for recovery. After centrifugation, the resulting material was washed and centrifuged several times with an aqueous ethanol solution with a mass concentration of 85%. The pH value was adjusted to neutral, and then the material was dried and crushed to obtain a modified chitosan, i.e. carboxymethyl chitosan, abbreviated as CMCTS, with a yield of 64.37%.

30 kg of the modified chitosan and 70 kg of hydroxypropyl methylcellulose were weighed, added to a mixer, and then mixed and stirred for 50 min to obtain the additive for a tile adhesive.

Comparative Example 5

1,300 kg of isopropanol was added to a jacketed, stirring reactor with a pressure of 0.6 MPa. Then 100 kg of chitosan powder (with a degree of deacetylation of 65%), and 40 kg of aqueous sodium hydroxide solution with a mass concentration of 50% were sequentially added thereto. The reactor was evacuated and purged with nitrogen to remove oxygen. The mixture was reacted at 40° C. for 6 h. The reactor was evacuated and purged with nitrogen to remove oxygen, and then evacuated again. 41 kg of propylene oxide was added to the reactor, and the resulting mixture was reacted at 50° C. for 12 h. The reactor was evacuated and purged with nitrogen to remove oxygen, and then evacuated again. 41 kg of propylene oxide was added to the reactor, and the resulting mixture was reacted at 50° C. for 12 h. The reactor was vented, and cooled to 40° C. The product mixture was centrifuged. The isopropanol used in the reaction was introduced into a recovery system for recovery. After centrifugation, the resulting material was washed and centrifuged several times with an aqueous ethanol solution with a mass concentration of 85%, and the pH value was adjusted to neutral. The material was dried and crushed to obtain a modified chitosan, i.e. hydroxypropyl chitosan, abbreviated as HPCTS, with a yield of 52.83%.

30 kg of the modified chitosan and 70 kg of hydroxypropyl methylcellulose were weighed, added to a mixer, and then mixed and stirred for 50 min to obtain the additive for a tile adhesive.

Comparative Example 6

1,300 kg of isopropanol was added to a jacketed, stirring reactor with a pressure of 0.6 MPa. Then 100 kg of chitosan powder (with a degree of deacetylation of 65%), and 59 kg of aqueous sodium hydroxide solution with a mass concentration of 40% were sequentially added thereto. The reactor was evacuated and purged with nitrogen to remove oxygen. The resulting mixture was reacted at 40° C. for 6 h. The reactor was evacuated and purged with nitrogen to remove oxygen, and then evacuated again. 31 kg of ethylene oxide was added to the reactor, and the resulting mixture was reacted at 50° C. for 12 h. The reactor was evacuated and purged with nitrogen to remove oxygen, and then evacuated again. 31 kg of ethylene oxide was added to the reactor, and the reaction was continued at 50° C. for 12 h. The reactor was vented, and cooled to 40° C. The product was centrifuged, and the isopropanol used in the reaction was introduced into a recovery system for recovery. After centrifugation, the resulting material was washed and centrifuged several times with an aqueous ethanol solution with a mass concentration of 85%, and the pH value was adjusted to neutral. The material was dried and crushed to obtain a modified chitosan, i.e. hydroxyethyl chitosan, abbreviated as HECTS, with a yield of 55.36%.

30 kg of the modified chitosan and 70 kg of hydroxypropyl methylcellulose were weighed, added to a mixer and mixed and stirred for 50 min to obtain the additive for a tile adhesive.

Comparative Example 7

100 kg of chitosan powder (with a degree of deacetylation of 90.5%), 16 kg of sodium hydroxide powder, and 20 kg of ethanol were sequentially added to a jacketed, stirring reactor with a pressure of 0.6 MPa. Chitosan was alkalized for 3 h. The reactor was evacuated and purged with nitrogen to remove oxygen, and then evacuated again. 21 kg of chloroacetic acid was added into the reactor, and the resulting mixture was reacted at 15° C. for 6 h. The reactor was evacuated and purged with nitrogen to remove oxygen, and then evacuated again. 25 kg of propylene oxide was added to the reactor, and the resulting mixture was reacted at 37° C. for 12 h. After the completion of reaction, the pressure was released to 0 MPa. The material was washed and centrifuged several times with an aqueous ethanol solution with a mass concentration of 85%, and the pH value was adjusted to neutral. The material was dried and crushed to obtain a modified chitosan, i.e. carboxymethyl hydroxypropyl chitosan, abbreviated as HPCMCTS, with a yield of 82.05%.

25 kg of the modified chitosan, 63 kg of hydroxypropyl methylcellulose, 5 kg of hydroxypropyl starch, 5 kg of cationic polyacrylamide, and 2 kg of sesame gum were weighed, added into a mixer, and then mixed and stirred at a rotation speed of 5 r/min for 20 min to obtain the additive for a tile adhesive.

Comparative Example 8

100 kg of chitosan powder (with a degree of deacetylation of 95.3%), 1 kg of sodium hydroxide powder, 15 kg of $Na_2SO_4$ and 400 kg of isopropanol were sequentially added to a jacketed, stirring reactor with a pressure of 0.9 MPa. The reactor was evacuated and purged with nitrogen to remove oxygen, and then evacuated again. 40 kg of propylene oxide and 10 kg of ethylene oxide, i.e. the etherifying agents, were sequentially added to the reactor. The temperature was increased to 20° C., and the pressure was 0.05 MPa, and under such conditions the first etherification reaction was carried out for 2.5 h. The temperature was slowly increased to 40° C., and the pressure was 0.11 MPa, and under such conditions the second etherification reaction was carried out for 3.0 h. The temperature was further increased to 55° C., and the pressure was 0.22 MPa, and under such conditions the third etherification reaction was carried out for 3.0 h. After the reaction, the unreacted alcohol and etherifying agent were condensed and recovered. The pressure was released to 0.01 MPa. The reaction product was dried at a temperature of 70° C. for 1.5 h, and the dried product was pulverized to a particle size of 0.18 mm to obtain a modified chitosan, i.e. hydroxypropyl hydroxyethyl chitosan, abbreviated as HPHECTS, with a yield of 83.12%.

The additive for a tile adhesive was prepared according to the method as described in Example 3.

Comparative Example 9

The modified chitosan was prepared according to the method as described in Example 1.

40 kg of the modified chitosan, 30 kg of hydroxypropyl methylcellulose, 20 kg of hydroxypropyl starch, 6 kg of anionic polyacrylamide, and 4 kg of guar gum were weighed, added into a mixer, and then mixed and stirred at a rotation speed of 50 r/min for 50 min to obtain the additive for a tile adhesive.

Performance Testing

The degree of substitution (DS) of carboxymethyl in the modified chitosan prepared in each example and comparative example was determined by the following method: after the fully washed, Cl-free modified chitosan sample was dried, then slowly heated in a muffle furnace and gradually heated to 700° C., and then burnt for 1 h such that the sample was completely ashed and quantitatively converted into $Na_2O$; the ash was dissolved in a sulfuric acid standard solution, and the excess sulfuric acid was titrated by using a NaOH standard solution; the degree of substitution (DS) of carboxymethyl in the modified chitosan is calculated according to formula (1):

$$DS=0.162B/(1-0.08B) \qquad \text{formula (1)}$$

In the above formula (1), B represents the molar amount (in mmol) of ½ $H_2SO_4$ consumed by per gram of sample, and it is calculated according to formula (2):

$$B=\frac{(C_{1/2\ H_2SO_4} \times V_{1/2\ H_2SO_4} - C_{NaOH} \times V_{NaOH})}{W_{modified\ chitosan}} \qquad \text{formula (2)}$$

In the formula (2), $C_{1/2\ H_2SO_4}$ represents the molar concentration (in mol/L) of sulfuric acid used; $V_{1/2\ H_2SO_4}$ represents the volume (in mL) of sulfuric acid used; $C_{NaOH}$ represents the molar concentration (in mol/L) of sodium hydroxide used; $V_{NaOH}$ represents the volume (in mL) of sodium hydroxide used.

The hydroxypropoxy content and hydroxyethoxy content of the modified chitosan prepared in each example and comparative example were measured in accordance with the test method of cellulose ether group content in Appendix D of JC/T2190-2013 "Cellulose Ether for Construction Dry-mix Mortar": under the catalysis of adipic acid, the cellulose ether was cracked by hydroiodic acid, and then the generated alkoxy and hydroxyalkoxy groups were quantitatively substituted by hydroiodic acid, and the product was subjected to a gas chromatography for measuring the alkoxy and hydroxyalkoxy content of the prepared modified chitosan.

The viscosity of the modified chitosan prepared in each example and comparative example was the viscosity of a 5% aqueous solution measured at 20° C. with a Brookfield LVT type viscometer.

The ash content of the modified chitosan prepared in each example and comparative example was determined in accordance with the experimental method for determination of sulfated ash in Appendix D in JC/T2190-2013 "Cellulose Ether for Construction Dry-mix Mortar".

The modified chitosans obtained in Examples 1-6 and Comparative Examples 1-9 were subjected to tests for determining degree of substitution of carboxymethyl, hydroxypropoxy content, hydroxyethoxy content, 5%/B-type LVT/viscosity and ash content. The results are shown in Table 1.

TABLE 1

Performance test results of the modified chitosans obtained in Examples 1-6 and Comparative Examples 1-9

| Items | Degree of substitution (DS) of carboxymethyl | Hydroxy-propoxy content (%) | Molar substitution (MS) of hydroxy-propoxy | Hydroxy-ethoxy content (%) | Molar substitution (MS) of hydroxy-ethoxy | DS of carboxymethyl + MS of hydroxy-propoxy + MS of hydroxy-ethoxy | 5%/B-type LVT/viscosity (cp) | Ash (%) |
|---|---|---|---|---|---|---|---|---|
| Example 1 | 0.24 | 21.27 | 0.55 | 1.49 | 0.04 | 0.83 | 1650 | 10.61 |
| Example 2 | 0.30 | 20.3 | 0.52 | 0 | 0.00 | 0.82 | 1050 | 12.75 |
| Example 3 | 0 | 24.99 | 0.67 | 6.51 | 0.18 | 0.85 | 875 | 9.93 |
| Example 4 | 0.96 | 0 | 0.00 | 0 | 0.00 | 0.96 | 2680 | 32.57 |
| Example 5 | 0 | 29.62 | 0.83 | 0 | 0.00 | 0.83 | 2475 | 6.58 |
| Example 6 | 0 | 0 | 0.00 | 26.03 | 0.85 | 0.85 | 1520 | 6.75 |
| Comparative Example 1 | 0.15 | 17.94 | 0.45 | 1.86 | 0.05 | 0.65 | 1690 | 6.64 |
| Comparative Example 2 | 0.18 | 19.63 | 0.50 | 0 | 0.00 | 0.68 | 1115 | 7.43 |
| Comparative Example 3 | 0 | 21.45 | 0.56 | 3.67 | 0.10 | 0.66 | 825 | 1.65 |
| Comparative Example 4 | 0.65 | 0 | 0.00 | 0 | 0.00 | 0.65 | 2350 | 17.48 |
| Comparative Example 5 | 0 | 24.41 | 0.65 | 0 | 0.00 | 0.65 | 2420 | 1.53 |
| Comparative Example 6 | 0 | 0 | 0.00 | 20.82 | 0.65 | 0.65 | 1475 | 1.57 |
| Comparative Example 7 | 0.20 | 15.13 | 0.37 | 0 | 0.00 | 0.57 | 1130 | 8.36 |
| Comparative Example 8 | 0 | 19.97 | 0.51 | 5.43 | 0.15 | 0.66 | 975 | 12.72 |
| Comparative Example 9 | The same as Example 1 | | | | | | | |

It can be seen from Table 1 that the modified chitosans prepared in Examples 1-6 of the present disclosure have a higher total degree of substitution of carboxymethyl, hydroxypropoxy and hydroxyethoxy (DS of carboxymethyl+MS of hydroxypropoxy+MS of hydroxyethoxy), and the total degree of substitution ranges from 0.80 to 1.00, significantly higher than the total degree of substitution (0.60-0.70) of carboxymethyl, hydroxypropoxy and hydroxyethoxy of the modified chitosans prepared in Comparative Examples 1-8. Also, the modified chitosan prepared in Example 2 has a higher degree of substitution of carboxymethyl and a lower molar substitution of hydroxypropoxy, while the modified chitosan prepared in Example 4 has the highest degree of substitution of carboxymethyl, but meanwhile the highest ash content. In addition, the modified chitosans with a carboxymethyl group obtained in Comparative Examples 1, 2 and 4 have a slightly higher viscosity than the modified chitosans obtained in Examples 1, 2 and 4 with corresponding serial numbers, but the modified chitosans without carboxymethyl group obtained in Comparative Examples 3, 5 and 6 have a slightly lower viscosity than the modified chitosans obtained in Examples 3, 5 and 6 with corresponding serial numbers.

The additives for a tile adhesive prepared in Examples 1-6 and Comparative Examples 1-9 were used to prepare tile adhesives respectively. The method was as follows: the components shown in Table 2 were placed into a mixer and mixed evenly, and 26% of water based on the total weight of components was added thereto, and the resulting mixture was mixed in accordance with the mixing equipment and mixing method specified in the standard JC/T547-2005 "Adhesives for ceramic wall and floor tiles", and subjected to various performance tests in accordance with the standard. Performance tests include slip, tensile bond strength, tensile bond strength after immersion in water, tensile bond strength after heat aging, tensile bond strength after freeze-thaw cycles, and tensile bond strength after 20 min of open time. The test results are shown in Table 3.

TABLE 2

Tile adhesive formulations of Examples 1-6 and Comparative Examples 1-9

| Water (g) | 42.5 cement (g) | Fine sand (g) | Heavy calcium powder (g) | Redispersible latex powder (g) | Calcium formate (g) | Ligocellulose (g) | Additive for a tile adhesive (g) |
|---|---|---|---|---|---|---|---|
| 260 | 400 | 450 | 121.5 | 20 | 3.5 | 1 | 4 |

TABLE 3

Performance test results of tile adhesives obtained in Examples 1-6 and Comparative Examples 1-9

| Items | Slip (mm) | Tensile bond strength (MPa) | Tensile bond strength after immersion in water (MPa) | Tensile bond strength after heat aging (MPa) | Tensile bond strength after freeze-thaw cycles (MPa) | Tensile bond strength after 20 min of open time (MPa) |
|---|---|---|---|---|---|---|
| Indicator | ≤0.5 | | | ≥0.5 | | |
| Example 1 | 0.2 | 1.077 | 0.686 | 0.858 | 0.772 | 0.603 |
| Example 2 | 0.1 | 1.125 | 0.732 | 0.903 | 0.827 | 0.641 |
| Example 3 | 0.3 | 0.946 | 0.649 | 0.817 | 0.738 | 0.588 |
| Example 4 | 0.3 | 0.823 | 0.518 | 0.695 | 0.604 | 0.511 |
| Example 5 | 0.4 | 0.861 | 0.552 | 0.733 | 0.645 | 0.537 |
| Example 6 | 0.4 | 0.908 | 0.597 | 0.779 | 0.686 | 0.559 |
| Comparative Example 1 | 0.4 | 0.752 | 0.436 | 0.606 | 0.501 | 0.448 |
| Comparative Example 2 | 0.3 | 0.786 | 0.478 | 0.651 | 0.553 | 0.472 |
| Comparative Example 3 | 0.5 | 0.672 | 0.398 | 0.566 | 0.471 | 0.409 |
| Comparative Example 4 | 0.5 | 0.416 | 0.248 | 0.411 | 0.355 | 0.277 |
| Comparative Example 5 | 0.6 | 0.497 | 0.307 | 0.483 | 0.396 | 0.339 |
| Comparative Example 6 | 0.6 | 0.589 | 0.353 | 0.521 | 0.438 | 0.375 |
| Comparative Example 7 | 0.6 | 0.453 | 0.268 | 0.445 | 0.371 | 0.301 |
| Comparative Example 8 | 0.6 | 0.703 | 0.419 | 0.587 | 0.496 | 0.423 |
| Comparative Example 9 | 0.6 | 0.431 | 0.252 | 0.426 | 0.368 | 0.283 |

It can be seen from Table 3 that the additives for a tile adhesive prepared in Examples 1-6 of the present disclosure could improve the tensile bonding strength of tile adhesive: the tensile bond strength, and the tensile bond strength after immersion in water, heat aging and freeze-thaw cycles meet the requirements of indicator of not less than 0.5 MPa, and meet the requirements of anti-slip of tile adhesive of not more than 0.5, the tensile bonding strength after 20 min of open time of not less than 0.5 MPa, and all of them are better than various indicators of the tile adhesives obtained in Comparative Examples 1-9. Among them, the tile adhesive prepared by the additive for a tile adhesive in Example 2 has the best performance.

It can be seen from the above examples that the method for preparing the modified chitosan according to the present disclosure is simple, easy to operate, has no three wastes discharged, and is green and environmentally friendly. The additive product for a tile adhesive formed from the modified chitosan, the cellulose ether, the starch ether, the enhancer and the rheological agent has stable product quality and has the function of improving the tensile bonding strength of the tile adhesive. When used in modern tiles, it could significantly improve the safety of the use of tiles and meet the needs of customers.

The above are only the preferred embodiments of the present disclosure. It should be pointed out that for those of ordinary skill in the art, without departing from the principle of the present disclosure, several improvements and modifications could be made, and these improvements and modifications should also be regarded as the protection scope of the present disclosure.

What is claimed is:

1. A method for preparing a modified chitosan, comprising
    mixing a chitosan, an inorganic base, and a dispersant having a hydroxyl group, adding an etherifying agent thereto, and subjecting the resulting mixture to an etherification reaction to obtain the modified chitosan,
    wherein the etherification reaction comprises a first etherification reaction, a second etherification reaction, and a third etherification reaction;
    wherein the first etherification reaction is performed at a temperature of 20-35° C. and a pressure of 0.05-0.1 MPa for 2.5-3.5 h;
    wherein the second etherification reaction is performed at a temperature of 40-50° C. and a pressure of 0.11-0.18 MPa for 2.0-3.0 h; and
    wherein the third etherification reaction is performed at a temperature of 55-65° C. and a pressure of 0.21-0.28 MPa for 2.0-3.0 h.

2. The method as claimed in claim 1, wherein the inorganic base comprises one or more of sodium hydroxide, potassium hydroxide, lithium hydroxide, and barium hydroxide.

3. The method as claimed in claim 1, wherein the dispersant having a hydroxyl group comprises one or more of methanol, ethanol, isopropanol, n-butanol, t-butanol, ethylene glycol, and diethylene glycol.

4. The method as claimed in claim 1, wherein the etherifying agent comprises one or more of chloroacetic acid, propylene oxide, and ethylene oxide.

5. The method as claimed in claim 1, wherein a mass ratio of the chitosan, the inorganic base, the dispersant having a hydroxyl group, and the etherifying agent is in the range of 1:(0.02-1.75):(0.1-2.0):(0.01-2.0).

6. The method as claimed in claim 1, further comprising adding a regulator, wherein a mass ratio of the chitosan to the regulator is not less than 10, and the regulator comprises sodium sulfate, sodium sulfite, sodium chloride, or sodium carbonate.

7. The method as claimed in claim 2, wherein a mass ratio of the chitosan, the inorganic base, the dispersant having a hydroxyl group, and the etherifying agent is in the range of 1:(0.02-1.75):(0.1-2.0):(0.01-2.0).

8. The method as claimed in claim 3, wherein a mass ratio of the chitosan, the inorganic base, the dispersant having a hydroxyl group, and the etherifying agent is in the range of 1:(0.02-1.75):(0.1-2.0): 0.01-2.0).

9. The method as claimed in claim 4, wherein a mass ratio of the chitosan, the inorganic base, the dispersant having a hydroxyl group, and the etherifying agent is in the range of 1:(0.02-1.75):(0.1-2.0):(0.01-2.0).

* * * * *